US006792511B2

(12) United States Patent
Hameed

(10) Patent No.: US 6,792,511 B2
(45) Date of Patent: Sep. 14, 2004

(54) DUAL CACHE MODULE SUPPORT FOR ARRAY CONTROLLER

(75) Inventor: Sohail Hameed, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 168 days.

(21) Appl. No.: 10/222,045

(22) Filed: Aug. 16, 2002

(65) Prior Publication Data
US 2004/0034745 A1 Feb. 19, 2004

(51) Int. Cl.[7] .............................................. G06F 12/00
(52) U.S. Cl. ............................... 711/135; 711/3; 711/5; 711/115; 714/5
(58) Field of Search ............................... 711/1, 3, 4, 5, 711/2, 111, 113, 115, 135, 133, 119; 714/5

(56) References Cited

U.S. PATENT DOCUMENTS 5,448,719 A * 9/1995 Schultz et al. ............... 714/5
5,586,248 A * 12/1996 Alexander et al. ........... 714/22
6,694,479 B1 * 2/2004 Murthy et al. ............. 714/805

* cited by examiner

Primary Examiner—Nasser Moazzami
Assistant Examiner—Brian R Peugh

(57) ABSTRACT

A dual-cache array controller for a hard-drive based storage system includes software for identifying and addressing errors made in user handling of the cache boards. Controller firmware is programmed to determine whether or not there is any unflushed data in a cache board, to identify a used cache board, and to detect whether or not the cache board belongs to the controller in use or to another controller. Once a problem is identified, the controller is further programmed to issue an appropriate error message and to take corrective action, such as locking up the system until the correct cache board changes are made.

20 Claims, 2 Drawing Sheets

DUAL CACHE MODULE SUPPORT FOR ARRAY CONTROLLER

BACKGROUND OF THE INVENTION

This invention relates to an array controller for use in a fault tolerant hard drive-based data storage system, and, more particularly, for managing and supporting up to two detachable cache modules in the array controller, making sure that the data is not lost because of user mishandling of the cache modules.

An array controller that allows one or two easily detachable cache modules to be plugged in also creates a potential problem of users mishandling the cache boards while there is good data in them. A user can swap the cache modules while plugging them in another controller, or can mix and match with another controller's cache modules while there is good data in them. This can cause the system to be corrupted if not detected and handled properly.

The use of two cache boards in an array controller increases cache capacity and performance. However this increase in capacity and performance comes at the price of potential mishandling by the end user. The user might cause the controller firmware to encounter anomalous or lock-up conditions due to the mishandling of the cache boards while, for example, moving them from one controller to another.

It would therefore be desirable for the controller to be able to detect and if possible correct for these anomalous situations and to avoid erasing good data in the cache boards, creating a system lock-up, or creating another undesirable fault condition.

SUMMARY OF THE INVENTION

According to the present invention, an external array controller based on Power PC processor includes two cache boards. The controller memory consists of 2 MB of ROM to hold firmware image and 16 MB of RAM as main memory. The controller also includes a local PCI bus, also called secondary PCI bus. All the PCI devices are connected to each other through this bus. Out of 16 MB, the lower 8 MB of RAM is only visible to Power PC and is used for code and local data. The upper 8 MB is visible on local PCI bus and is available for access to all the devices on the bus. The local PCI devices also include a bridge between Power PC and local PCI bus, two dual-channel SCSI controllers, each with two SCSI buses, and a Fiber Channel controller. The controller enclosure box also has a PCI bus, called Primary PCI bus and two controller slots connected through this bus. The controller has a bridge between the secondary PCI bus and the primary PCI bus. The bridge also serves as a DMA engine. It also has provision for attaching up to two DIMMs (memory modules). The bridge is capable of DMAing (transferring data) from secondary PCI bus or its memory to primary PCI bus.

The bridge memory (DIMMs) is used for the controller cache. Thus, the terms "DIMMs" and "cache boards" are used interchangeably. The DIMMs are equipped with batteries in order to preserve data if power or the controller fails while there is cached data in the DIMMs. The firmware is implemented so that it caches data at the logical volume level and not at the physical drives level. The entire logical volume is viewed as divided into logical volume stripes, each being 32 sectors long. Similarly, the cache is also viewed as divided into cache lines, each line being 32 sectors in length. A given stripe is mapped on to a cache line using set associative mapping. There are algorithms to handle conflicts, that is, if a stripe is mapped on to an already occupied cache line. The unit of cache accesses is a sector (512 bytes), that is, cache can only be accessed in terms of sectors.

The controller cache is also referred to as Array Accelerator. As the name suggests, it provides a big boost to the controller performance. The function of having controller cache between host and disk drives is much similar to having processor cache between the processor and main memory in a computer system. For example, for a write operation initiated from a host, the controller can cache the incoming data and immediately send back completions to the host without actually writing data to disk. The data is later flushed to the drives when the controller is free enough. This way its performance increases by many folds. Such a write operation is referred to as a "Posted Write". Similarly, if the controller observes a pattern in read operations initiated by the host, it can read more data from the drives then needed into the cache, so that later on when host needs the data, it is readily available from cache.

The array controller of the present invention also includes software to enable the controller to determine whether or not there is any unflushed data in a cache board, to identify a used cache board, and to detect whether or not the cache board belongs to the controller in use or to another controller. Once a problem is identified, the controller is further programmed to issue an appropriate message and to take corrective action, if possible.

The foregoing and other objects, features and advantages of the invention will become more readily apparent from the following detailed description of a preferred embodiment of the invention, which proceeds with reference to the accompanying drawings.

DESCRIPTION OF THE INVENTION

Figure 1:
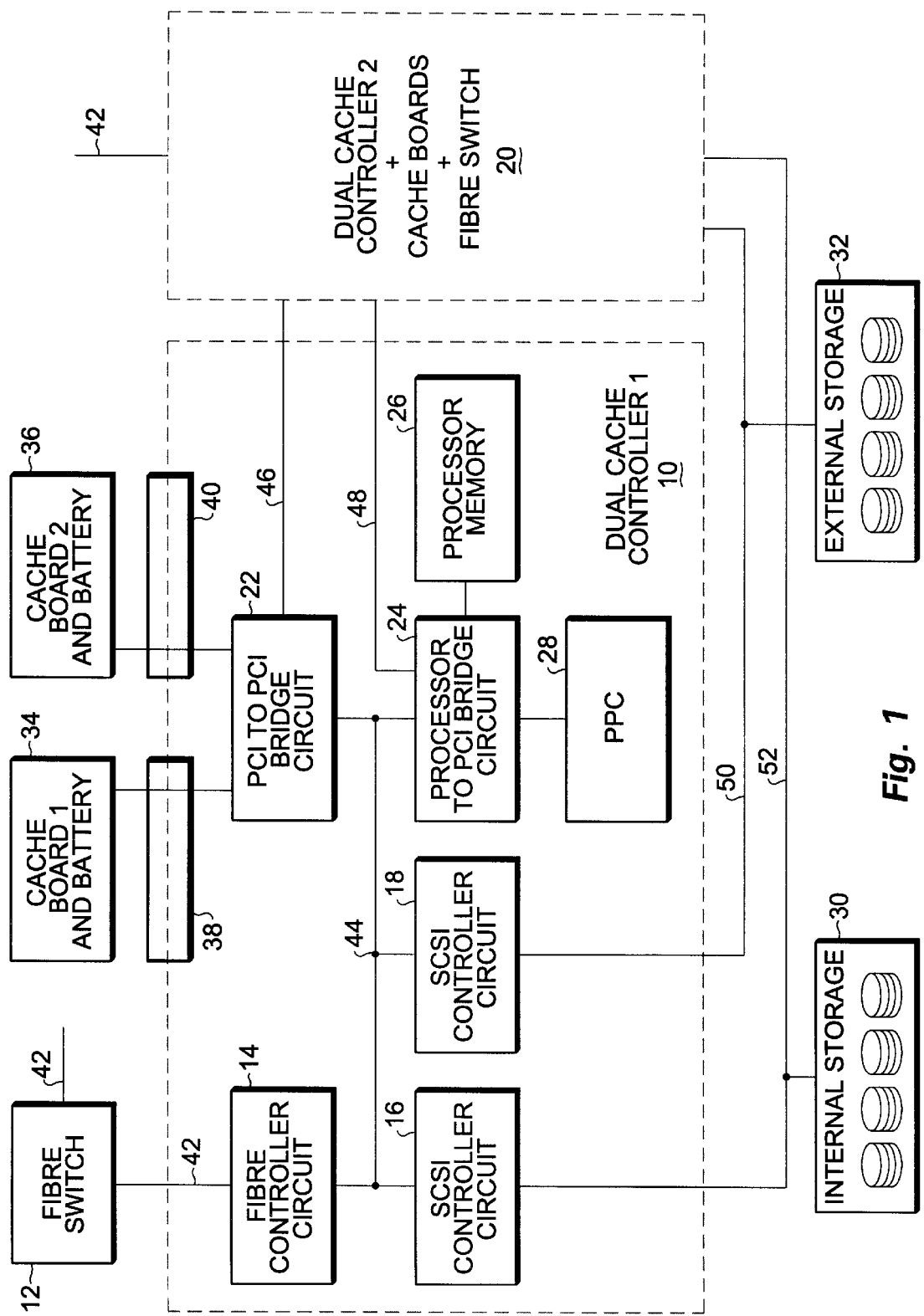
FIG. 1 is a block diagram of the dual-cache controller according to the present invention, bridge, and including a fibre switch, first and second cache boards, and internal and external storage.

Referring now to FIG. 1, a PCI to PCI bridge 22 on the controller connects the secondary PCI bus 44 (or local PCI bus on the controller) to the primary PCI bus 46 on the controller 10 box (back-plane). Bridge 22 is also a DMA engine, capable of transferring data from local PCI bus to the primary PCI bus. Since there can be two controllers 10 and 20 in a box, both of them are connected through the primary PCI bus 46, and one controller can transfer data from a device on its local PCI bus 44 to another device on the other controller using the bridge circuit 22.

A representative controller 10 includes a fibre controller circuit 14 for receiving the fibre bus 42 switched through external fibre switch 12. The fibre controller circuit 14 is in communication with first and second SCSI controller circuits 16 and 18, as well as PCI to PCI bridge circuit 22, and processor to PCI bridge circuit 24 through the local PCI bus 44. In turn, the first and second SCSI controller circuits 16 and 18 are in communication with internal storage 30 and external storage 32, respectively through SCSI bus 52 and 50. Processor to PCI bridge circuit 24 is in communication with processor memory 26 and Power PC Processor ("PPC")

28. Bridge circuit 24 is also optionally in communication with a similar bridge circuit in a second controller 20 through serial and kill busses 48.

Cache boards 34 and 36 are in electrical communication with bridge circuit 22, as is further described below. Cache boards 34 and 36 are identical and are physically connected to the controller board or box 10 through coupling devices 38 and 40 such as a multi-pin electrical connector and slot as is well known in the art.

Figure 2:
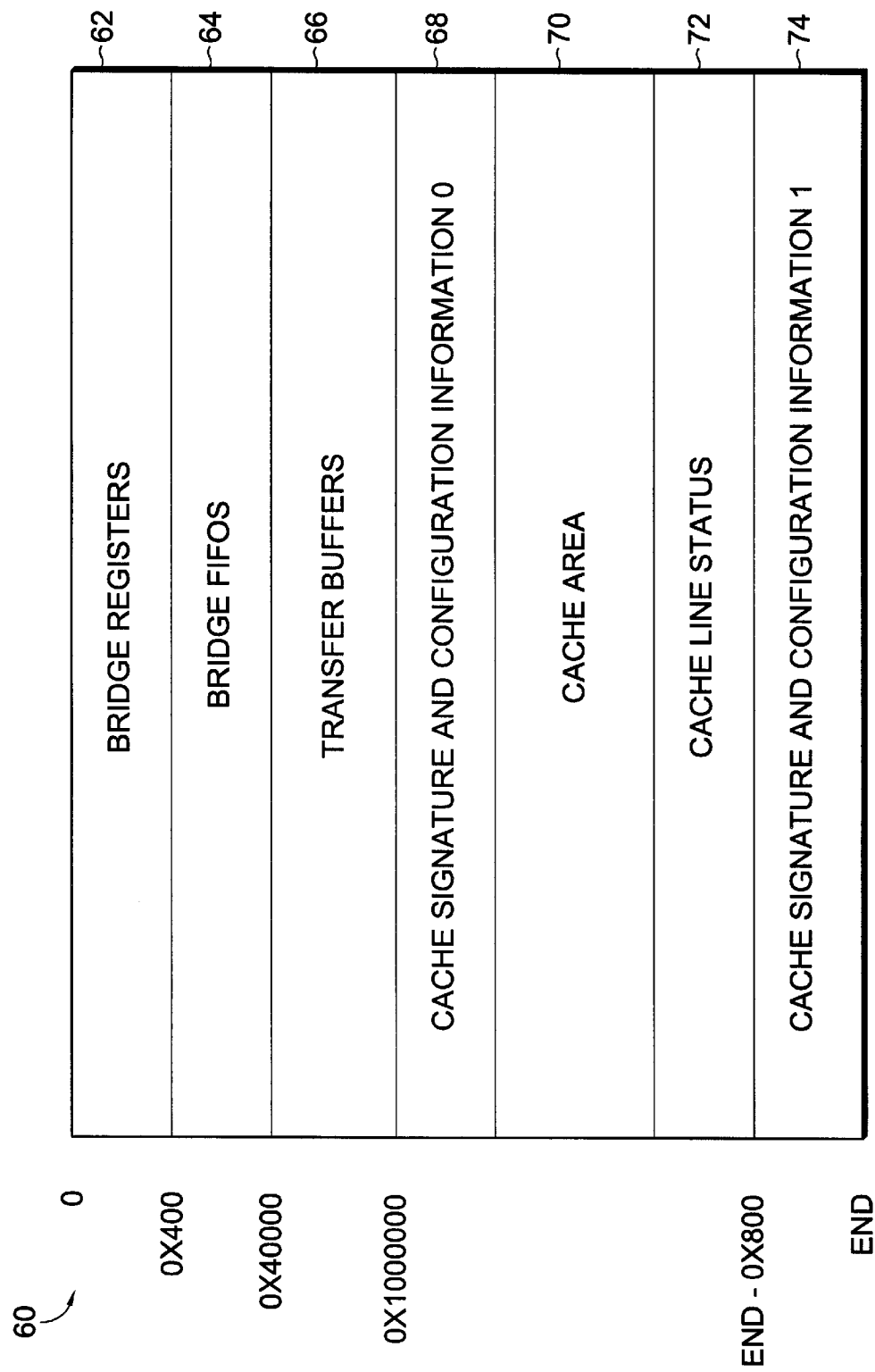
FIG. 2 is a an address map of a PCI to PCI bridge circuit used in the dual-cache controller of the present invention shown in FIG. 1.

The bridge circuit 22 also has its own memory space, which is shown in the memory address map 60 of FIG. 2. The controller 10 has provision of attaching up to two cache boards or DIMMs (memory modules) 34 and 36 behind the bridge 22. Each of the cache boards 34 and 36 is typically 64 MB or 128 MB in capacity. This memory is controlled by the bridge 22 and is mapped on to the local PCI bus 44 so that other devices such as a Power PC 28 can access it. On the controller 10, the base address for the bridge 22 memory is set at 0xa0000000. Some of the bridge 22 memory is used for other purposes, but mostly it is used as cache.

Referring to FIG. 2, the bridge address map 60 is spread across one or two DIMMs. The numbers along the left hand side of the address map are the offsets. Note that the start of the Cache Line Status area depends upon the total memory capacity.

The first 0x400 bytes of the address space 62 are reserved for the bridge registers. This includes configuration registers, transaction queue registers, SDRAM bank registers, and the like. However, before these registers can be accessed as memory mapped registers, some of the configuration registers have to be set using PCI configuration cycles.

The next part of the memory 64 is allocated for the bridge 22 FIFOs. This space ranges from offset 0x400 to 0x40000 (nearly 256 kB). The bridge 22 uses this space to store the values posted to its FIFOs. On the controller 10, these FIFOs are heavily used for message passing between the two controllers 10 and 20.

The next portion of the memory 66 is allocated for transfer buffers. This space ranges from offset 0x40000 to 0x1000000, (16 MB–256 kB) in size. The transfer buffers are the temporary buffers used to hold data during host I/Os and other internally generated I/Os, and to perform various RAID operations on the data.

The Cache Signature and Configuration Information (CSCI) area 68 starts at offset 0x1040000. It is 0x800 bytes long. However, in order to align it with 32-sector boundary (cache line boundary, as is explained in further detail below), it is extended to 32 sectors in length. Hence, it ranges from offset 0x1000000 to 0x1004000.

The CSCI area 68 consists of a cache signature, which is a string of characters that the firmware uses to verify that a specific pre-identified dual-cache controller once used the cache board. It also consists of a Reserved Information Sectors ("RIS") configuration signature, which is used to verify that the cache board contains data that belongs to this particular controller. The RIS is a collection of sectors on drives that are reserved to store information regarding the logical volume configuration. The CSCI also has an RIS update counter to verify if the data is obsolete. It is also used to store critical information such as a snap shot of expansion progress so that the controller can recover from a power failure.

This CSCI area 68 is specially added for Dual Cache Modules support. An exact copy of Cache Signature and Configuration Information is also stored at the end of bridge memory in memory area 74.

The "Cache Area" 70 is a bridge 22 memory area that is used by the firmware as cache. It is the largest of all the other portions of bridge memory. It is divided into cache lines, each being 32 sectors. It starts at offset 0x1044000 and its length depends on the number of DIMMs attached and their capacities. The cache may be divided into two parts, Read Cache and Write Cache. The user can configure the sizes of each part. Typically they are equal in size. The read cache is used to bring in read-ahead data and write cache is used for posted-write operations. Since bridge memory is battery-backed, the data in cache that has not been flushed on to drives, called dirty data, is preserved if the controller fails or power fails while I/Os are going on.

The "Cache Lines Status" area 72 of bridge 22 memory is used by the firmware to store the minimum status information of each and every cache line, which should not be lost if the power fails or the controller fails. It consists of two 32-bit words per cache line. The first word, called a tag, represents a unique value that identifies the logical volume stripe that is stored in the corresponding cache line. The other word, called dirty status, is the bit map of the 32 sectors, one bit per sector, showing which of the sectors in the cache line are dirty. A dirty sector is the sector that contains posted write data that has not been flushed to drives yet.

Since there are two 32-bit words per cache line, the size of status Cache Lines Status area 72 depends upon the number of cache lines, which in turn depends upon the number of DIMMs and their capacities.

Memory section 74 is an exact copy of the Cache Signature and Configuration Information area 68 stored at offset 0x1040000 and described above. However, this area is exactly 0x800 bytes in length and is always located at the end of the bridge memory.

Although there are two slots 38 and 40 on the controller 10, the firmware supports both one DIMM as well as two DIMM configurations. If there is only one DIMM 34, it may be inserted in any of the slots 38 and 40. In other words, all the possible combinations are valid configurations. Note however that if there are two DIMMs 34 and 36 used, the implementation requires that they are equal in capacity. In this case, the Address Map 60 is split across the two boards 34 and 36, and the split occurs within the Cache region 70 of the address map.

Table 1 below shows some of the cases in which the two cache boards are improperly handled. Dx is a cache board in slot x (0 or 1) containing unflushed data. Ex is a cache board that was previously used in another controller and contains unflushed data. X is defined as an empty cache board slot.

TABLE 1

| Slot 0/ Slot 1 Before | Slot 0/ Slot 1 After | Reason for the Error |
|---|---|---|
| D0/D1 | D0/X | The user removed the cache board from slot 1 while there was unflushed data in it. |
| D0/D1 | D1/X | The user removed the cache board in slot 0 and probably replaced the one in slot 1 into slot 0. |
| D0/D1 | D1/D0 | The user swapped the cache boards, probably while replacing a failed controller with a new one. |
| D0/D1 | D0/E1 | The user accidentally replaced the cache board in slot 1 with another cache board being used in slot 1 of another controller. |
| D0/D1 | E0/D1 | The user accidentally replaced the cache board in slot 0 with another cache board being used in slot 0 of another controller. |

TABLE 1-continued

| Slot 0/<br>Slot 1<br>Before | Slot 0/<br>Slot 1<br>After | Reason for the Error |
|---|---|---|
| D0/X | D0/E1 | The user added a cache board, but the cache board is a part of cache on some other controller. |
| D0/D1 | D1/E1 | The user replaced one of the cache boards with another controller's cache board and swapped their positions as well. |
| D0/D1 | E0/D1 | The user replaced one of the cache boards with another controller's cache board. |

To ascertain the existence of a problem with the cache boards, and to effect a possible solution, the following operations are performed during power-up: determining if there is unflushed data in a cache board; identifying a used cache board; and detecting if the cache board belongs to this controller or to another controller.

The firmware has been coded in such a way that batteries are enabled only upon the very first write from the controller. The firmware disables the batteries as soon as it is done flushing. Hence the batteries are enabled only when there is some dirty data (unflushed data) in the cache. It is primarily done to save battery power, but doubles as an excellent way of telling whether or not there is any unflushed data in a cache board.

The second operation performed is to identify if a cache board was ever used in any predetermined dual-cache board controller. For this purpose the Cache Signature and Configuration Information (CSCI) area is used. This area stores a string called the "cache signature", which identifies the presence of a specific cache board. The firmware writes this signature on every cache board at the power up time. Since there are two copies of CSCI area and both of them are located at a certain computable address, that memory location can be read to determine if a cache board was ever used.

The cache signatures can also be used to identify if the cache consisted of only one cache board or two cache boards. If for a given cache board, we can read cache signature in CSCI copy 0 and CSCI copy 1, then the cache board has full cache contained in it. If on the other hand we just find CSCI copy 0 and no CSCI copy 1, then it means that the cache board is the first half of the total cache. Similarly, if we just find CSCI copy 1 and no CSCI copy 0, then it means that the cache board is the second half of the total cache.

The third and final operation that we should be performed is to determine if the cache board attached to this controller really belongs to it. For this purpose we will make use of the RIS signature stored in Cache Signature and Configuration Information (CSCI) area. The RIS signature is also stored on the drives. Hence we can read RIS signature from the drives and compare it to the one read from CSCI to determine if the cache board has data that was meant for the drives on this controller. Here we are assuming that the chances of having the same RIS signature between two controllers' logical volumes is negligibly small, which is a reasonable assumption.

When the controller powers up, the firmware has to figure out if the cache boards have been replaced since the last power cycle. Most of the time this will not be the case. However, due to some rare occasions of controller failure, the user will have to move the cache boards to a new controller and in doing so, he might do things like swapping the cache boards, or even worse, mix and match cache boards of some other controller. In such cases, the firmware determines what has happened by looking at the currently attached cache boards.

The first thing that the firmware does is to look at the batteries of the attached cache boards to find out which cache boards have unflushed data. If all of the cache boards have batteries disabled, it just proceeds as normal. If at least one of the boards has the batteries enabled, then it looks at the two copies of Cache Signature and Configuration Information (CSCI) area in the cache boards that have batteries enabled. Depending upon the number of cache boards that firmware finds with batteries enabled, and whether it finds CSCI copy 0 and/or copy 1, it may run into one of the different possible error cases described below in further detail.

For this case, the firmware tries to access both CSCI areas. Depending upon which copy it finds and which it does not, the firmware will have to handle four different cases. Table 3 explains these cases. We also assign a likelihood to each of these cases. The likelihood is an integer, between 1 and 4 inclusive, assigned to each case showing the approximate relative probability of occurrence. Table 2 gives the meaning of each likelihood level.

TABLE 2

| Likelihood | Meaning |
|---|---|
| 1 | Probability of occurrence is negligibly small. Probably will never occur. |
| 2 | May occur but very rare chance. |
| 3 | Rare but relatively higher chance of occurrence. |
| 4 | Highest chance of occurrence. This will be the normal case. |

As explained above, Table 3 explains the various possible case when there is only one cache board attached and the batteries are enabled, wherein CS0 is the Cache Signature and Configuration Information Copy 0, and CS1 is the Cache Signature and Configuration Information Copy 1.

TABLE 3

| Sub case # | CS0 | CS1 | Likeli-hood | How could it happen? |
|---|---|---|---|---|
| 1.0 | Absent | Absent | 2 | Batteries depleted while there was unflushed data in cache OR Enable batteries of a new cache board with some software/hardware tool. |
| 1.1 | Absent | Present | 2 | Misplace one of the two cache boards while replacing a failed controller. |
| 1.2 | Present | Absent | 3 | Misplace one of the two cache boards while replacing a failed controller. |
| 1.3 | Present | Present | 4 | Turn off the controller while I/Os are going on. Turn it back on. |

In Subcase 1.0 both the CSCI copies are absent but the batteries are enabled. This could happen if the controller was left without power for a couple of days and the cache board had batteries enabled because of unflushed data in it. The batteries got depleted and the data was lost. This is likely to happen. The other way to run into this situation would be by enabling batteries of a new cache board using some kind of hardware or software tools. This is quite unlikely. We assign the overall likelihood of 2 to this case. The controller reports possible data loss to the user in this case and locks up.

In Subcases 1.1 and 1.2, CSCI copy 0 is not present but CSCI copy 1 is present. Hence the cache board was once one of the two cache boards used in a controller and still has the unflushed data from that controller. This probably occurred because the user stopped the running controller, and removed one of the cache boards. In this situation, the firmware locks up and outputs the message to replace the missing cache board.

Subcase 1.3 is the normal situation wherein the cache board has both the CSCI copies present. That is, the cache board was used as cache in the previous power cycle, and the data could not be flushed to the drives. The firmware proceeds normally by first flushing the data on the drives and then uses the cache board as fresh new cache.

Error Case 2 occurs when there are two cache boards but only one of them has the batteries enabled. In this case, we only consider the cache board with batteries enabled. Again, the firmware looks at the two copies of CSCI and determines the situation it is in. Table 4 shows the various sub-cases.

TABLE 4

| Sub-case # | CS0 | CS1 | Likeli-hood | How could it happen? |
|---|---|---|---|---|
| 2.0 | Absent | Absent | 2 | Batteries depleted while there was unflushed data in cache OR Enable batteries of a new cache board with some software/hardware tool. |
| 2.1 | Absent | Present | 2 | Replace one of the two cache boards with a new unused cache board. |
| 2.2 | Present | Absent | 3 | Replace one of the two cache boards with a new unused cache board. |
| 2.3 | Present | Present | 4 | Add another cache board to increase cache capacity. |

In Subcase 2.0, both the CSCI copies are absent but the batteries are enabled. This could happen if the controller was left without power for a couple of days and the cache board had batteries enabled because of unflushed data in it. The batteries got depleted and the data was lost. This is likely to happen. The other way to run into this situation would be by enabling batteries of a new cache board using some kind of hardware or software tools. This is quite unlikely. We assign the overall likelihood of 2 to this case. The controller reports possible data loss to the user in this case and locks up.

In Subcases 2.1 and 2.2, one of the CSCI copies is present and the other one is not. Hence the cache board was once one of the two cache boards used in a controller and still has the unflushed data from that controller. This can only occur if the user replaced the other module with the one totally unused. The chance of this case to occur is very low. In this situation, the firmware locks up and outputs the message to replace the missing cache board.

In Subcase 2.3. there are two cache boards, one of them has batteries disabled and the other one has batteries enabled. The one with batteries enabled has full cache in it. This probably occurred because the user added a new cache board. This is very likely to occur.

The firmware flushes the data in the cache board that has batteries enabled. Once it is done it reconfigures the cache to extend it to two cache modules. This can only be done when there are no outstanding I/Os going on. One way of doing so is at the boot-up time. However flushing the whole cache could take up to a couple of minutes if the cache is full with good data. Causing the user to wait for such a long time during power-up is not feasible. The other way is to leave the cache configuration to use only the enabled cache board during boot up time and set a flag saying that cache reconfiguration is needed. Then in the background, the firmware constantly keeps on checking to see if the reconfiguration is needed and there are no outstanding I/Os going on. As soon as this condition is satisfied, it goes ahead and reconfigures the cache to extend to two cache boards instead of one. Although there may be some time when there are two cache boards on the controller, but only one of them is being used as cache, this method will extend the cache configuration in the background and this will not be noticed by the end user.

Error case 3 is when there are two cache boards and both of them have the batteries enabled. In this error case, there are two cache boards present and both of them have batteries enabled, that is, unflushed data. The two cache boards may not belong to the same controller. The firmware looks at the two copies of CSCI in both the cache boards to figure out what might have happened. Table 5 shows the different possible error scenarios, in which CS0M0 is Copy 0 of CSCI (CS0) in slot 0 cache board (module M0), CS1M0 is Copy 1 of CSCI (CS1) in slot 0 cache board (module M0), CS0M1 is Copy 0 of CSCI (CS0) in slot 1 cache board (module M1), and CS1M1 is Copy 1 of CSCI (CS1) in slot 1 cache board (module M1).

TABLE 5

| Sub case # | CS0M0 | CS1M0 | CS0M1 | CS0M1 | Likelihood |
|---|---|---|---|---|---|
| 3.0 | Absent | Absent | Absent | Absent | 2 |
| 3.1 | Absent | Absent | Absent | Present | 1 |
| 3.2 | Absent | Absent | Present | Absent | 1 |
| 3.3 | Absent | Absent | Present | Present | 1 |
| 3.4 | Absent | Present | Absent | Absent | 1 |
| 3.5 | Absent | Present | Absent | Present | 2 |
| 3.6 | Absent | Present | Present | Absent | 3 |
| 3.7 | Absent | Present | Present | Present | 2 |
| 3.8 | Present | Absent | Absent | Absent | 1 |
| 3.9 | Present | Absent | Absent | Present | 4 |
| 3.10 | Present | Absent | Present | Absent | 2 |
| 3.11 | Present | Absent | Present | Present | 2 |
| 3.12 | Present | Present | Absent | Absent | 1 |
| 3.13 | Present | Present | Absent | Present | 2 |
| 3.14 | Present | Present | Present | Absent | 2 |
| 3.15 | Present | Present | Present | Present | 2 |

In Subcases 3.0, 3.1, 3,2, 3.3, 3.4, 3.8 and 3.12, at least one of the cache boards has neither CSCI copy 0 nor CSCI copy 1, yet its batteries are enabled. This could happen if the controller was left without power for a couple of days and the cache board had batteries enabled because of unflushed data in it. The batteries got depleted and the data was lost. This is likely to happen. The other way to run into this situation would be by enabling batteries of a new cache board using some kind of hardware or software tools. This is quite unlikely. We assign the overall likelihood of 2 to this case. The controller reports possible data loss to the user in this case and locks up.

In Subcases 3.5 and 3.10 both the cache boards have either copy 0 or copy 1. This means that one of the boards does not belong to this controller. By matching the RIS signature on the drives with the one in CSCI, the firmware finds out which one is alien. Then it outputs this message on the serial port to replace that cache board and locks up. This case is very unlikely to happen.

In Subcase 3.6 the firmware finds out that both the CSCI copies are present but the cache boards are swapped. That is, copy 0 is in the cache board in slot 1 and vice versa. The firmware internally reprograms the PCI-to-PCI Bridge Bank Registers to swap the address space. This way it automatically swaps the cache boards from within the firmware and the user does not even notice any difference. This is likely to happen when the user replaces a failed controller with a new one and reuses the old cache boards.

In Subcases 3.7, 3.11, 3.13 and 3.14 one of the cache boards has full cache data on it and the other cache board is a part of another cache. This can happen only when the user tries to extend the controller's cache, but he accidentally uses an already in-use cache board on another controller. This is very unlikely to happen. The firmware uses RIS signature to determine if the cache board that has the full cache belongs to this controller. If so, it flushes the contents of the cache. It then locks up outputting an appropriate message.

Subcase 3.9 is the normal case and most likely to occur when there are two cache boards attached. This can happen when the user turns off the controller while I/Os are going on or the controller fails, then he replaces the controller with a new one and places the cache boards in appropriate slots. The firmware just proceeds as normal in this case.

In Subcase 3.15 both the cache boards have their own full caches. At least one of them does not belong to this controller. The firmware finds that out by comparing RIS signature, and then locks up after displaying a message to the user to replace the wrong cache board.

Having described and illustrated the principle of the invention in a preferred embodiment thereof, it is appreciated by those having skill in the art that the invention can be modified in arrangement and detail without departing from such principles. We therefore claim all modifications and variations coming within the spirit and scope of the following claims.

I claim:

1. A method of operating a dual cache board array controller comprising:

determining whether or not there is any un-flushed data in a cache board;

identifying whether or not the cache board has been previously used; and detecting whether or not the cache board belongs to present controller or to another controller.

2. The method of claim 1 further comprising performing the method upon power-up of the dual-cache array controller.

3. The method of claim 1 in which determining whether or not there is any un-flushed data in the cache board comprises detecting whether or not a battery on the cache board has been enabled.

4. The method of claim 1 in which detecting whether or not the cache board belongs to the present controller or to another controller comprises detecting the presence or absence of a cache signature.

5. The method of claim 1 in which detecting whether or not the cache board belongs to the present controller or to another controller comprises detecting the presence or absence of an RIS signature.

6. The method of claim 1 further comprising detecting a cache signature but not an RIS signature in a cache board.

7. The method of claim 6 further comprising outputting a user message to replace a missing cache board.

8. The method of claim 1 further comprising detecting un-flushed data in a first cache board but not in a second cache board.

9. The method of claim 8 further comprising outputting a user message to replace a missing cache board.

10. The method of claim 8 further comprising reconfiguring the cache to extend to two cache boards as a background task.

11. The method of claim 1 further comprising detecting unflushed data in a first and a second cache board.

12. The method of claim 11 further comprising outputting a user message to replace a missing cache board.

13. The method of claim 11 further comprising swapping the address space of the first and second cache boards.

14. The method of claim 11 further comprising outputting a user message to replace a wrong cache board.

15. A method of operating a dual cache board array controller in a hard drive data storage system comprising:

determining whether or not there is any un-flushed data in a cache board;

identifying whether or not the cache board has been previously used;

detecting whether or not the cache board belongs to a present controller or to another controller; and reconfiguring cache data in the cache boards, outputting a user message, or locking up the hard drive data storage system if an error is detected.

16. The method of claim 15 further comprising performing the method upon power-up of the dual-cache array controller.

17. The method of claim 15 in which determining whether or not there is any un-flushed data in the cache board comprises detecting whether or not a battery on the cache board has been enabled.

18. The method of claim 15 in which detecting whether or not the cache board belongs to the present controller or to another controller comprises detecting the presence or absence of a cache signature.

19. The method of claim 15 in which detecting whether or not the cache board belongs to the present controller or to another controller comprises detecting the presence or absence of an RIS signature.

20. The method of claim 15 in which outputting a user message comprises outputting a user message to replace a missing cache board or a user error message.

* * * * *